United States Patent
Braham et al.

(10) Patent No.: US 10,609,755 B2
(45) Date of Patent: Mar. 31, 2020

(54) LOCATION BASED THIRD PARTY NOTIFICATION

(71) Applicant: International Business Machines Corporation, Armonk, NY (US)

(72) Inventors: Adam D. Braham, Rochester, MN (US); Jason A. Nikolai, Rochester, MN (US); John M. Santosuosso, Rochester, MN (US); Jeffrey A. Schmidt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/828,456

(22) Filed: Dec. 1, 2017

(65) Prior Publication Data
US 2019/0174569 A1 Jun. 6, 2019

(51) Int. Cl.
*H04W 24/00* (2009.01)
*H04W 76/23* (2018.01)
*H04W 4/12* (2009.01)
*H04W 4/021* (2018.01)
*H04W 76/14* (2018.01)
*H04L 29/08* (2006.01)
*G06Q 50/00* (2012.01)

(52) U.S. Cl.
CPC ............ *H04W 76/23* (2018.02); *H04L 67/18* (2013.01); *H04W 4/021* (2013.01); *H04W 4/12* (2013.01); *H04W 76/14* (2018.02); *G06Q 50/01* (2013.01); *H04L 67/306* (2013.01)

(58) Field of Classification Search
CPC ....... H04L 51/046; H04L 51/20; H04L 51/32; H04W 4/02; H04W 4/21
See application file for complete search history.

(56) References Cited

U.S. PATENT DOCUMENTS

| | | |
|---|---|---|
| 7,808,378 B2 | 10/2010 | Hayden |
| 7,844,247 B2 | 11/2010 | Chen et al. |
| 8,325,902 B2 | 12/2012 | Agrawal |
| 8,937,548 B1 | 1/2015 | Miasnik |
| 2014/0177812 A1 | 6/2014 | Barrett |
| 2014/0253666 A1 | 9/2014 | Ramachandran et al. |
| 2015/0032826 A1 | 1/2015 | Gunaratnam |
| 2015/0358794 A1* | 12/2015 | Nokhoudian ........... H04W 4/90 455/404.1 |
| 2018/0098206 A1* | 4/2018 | Nguyen .................. H04W 4/90 |

FOREIGN PATENT DOCUMENTS

FR 2964284 B1 8/2012

* cited by examiner

*Primary Examiner* — Barry W Taylor
(74) *Attorney, Agent, or Firm* — Aaron N. Pontikos

(57) ABSTRACT

Embodiments of the present invention provides methods, computer program products, and a system for determining a set of potential responders to alert a second party regarding an urgent communication. Embodiments of the present invention can be used to determine if a missed communication placed by a first party to a second party is an urgent communication. Embodiments of the present invention can be used to determine a set of potential responders based, at least in part, on a variety of possible locations of a communication device belonging to the second party.

18 Claims, 5 Drawing Sheets

LOCATION BASED THIRD PARTY NOTIFICATION

BACKGROUND

The present invention relates generally to the field of mobile devices, and more particularly to generating emergency notifications for mobile devices.

Mobile devices such as cellular phones and smart watches serve as a multi-functional tool in communications such as short message service (SMS), multimedia message service (MMS), email, Internet access, short range wireless communication, as well as the ability to make or receive phone calls. Prior to a mutual communication link being established between two parties, a first party alerts a second party that communication is being attempted. This alert can be in a form of a mobile device ringing or vibrating. The second party establishes a mutual communication link with the first party once the second party becomes aware of the alert and confirms the mutual communication link by answering the call or by communicating through an alternative means. If the second party fails to respond to the alert, then the first party can either attempt to establish communications using the same method again, attempt a different method of communication from the methods listed above, or leave a voicemail for the second party to receive at a later time.

SUMMARY

Embodiments of the present invention disclose a method, a computer program product, and a system for determining a set of potential responders to alert a second party regarding an urgent communication. In one embodiment of the present invention, a method is provided comprising: determining a mutual communication link was not established for a communication between a first electronic device and a second electronic device, wherein the first electronic device is associated with a first user and the second device is associated with a second user; determining the communication between the first electronic device and the second electronic device is abnormal; estimating a set of possible locations for the second electronic device; and determining a set of potential responders to alert the second user based, at least in part, on the set of possible locations for the second electronic device.

DETAILED DESCRIPTION

Embodiments of the present invention recognize that in some situations it is inconvenient or impossible to access a communication device. For example, it can be difficult for a user to use a communication device while doing physical activities or activities that would endanger the device (e.g. swimming), or in the event that the device becomes disabled due to technical issues. Additionally, there exists alerting devices that alert a user of an attempted communication, such as pagers and smart watches, which require having the alerting device on person at all times and that the alerting device is sufficiently charged. In the event a communication device or an alerting device is unavailable, important messages that require immediate attention could be missed.

Embodiments of the present invention provide solutions for improving communication alert systems. As described in greater detail later in this specification, embodiments of the present invention can be used to generate a notification and alert a user of an urgent communication without the communication device of the user. For example, embodiments of the present invention can relay an urgent communication between a first party and a second party based, at least in part, on the location of the second party. Implementation of embodiments of the invention may take a variety of forms, and exemplary implementation details are discussed subsequently in the specification with reference to the Figures.

Figure 1:
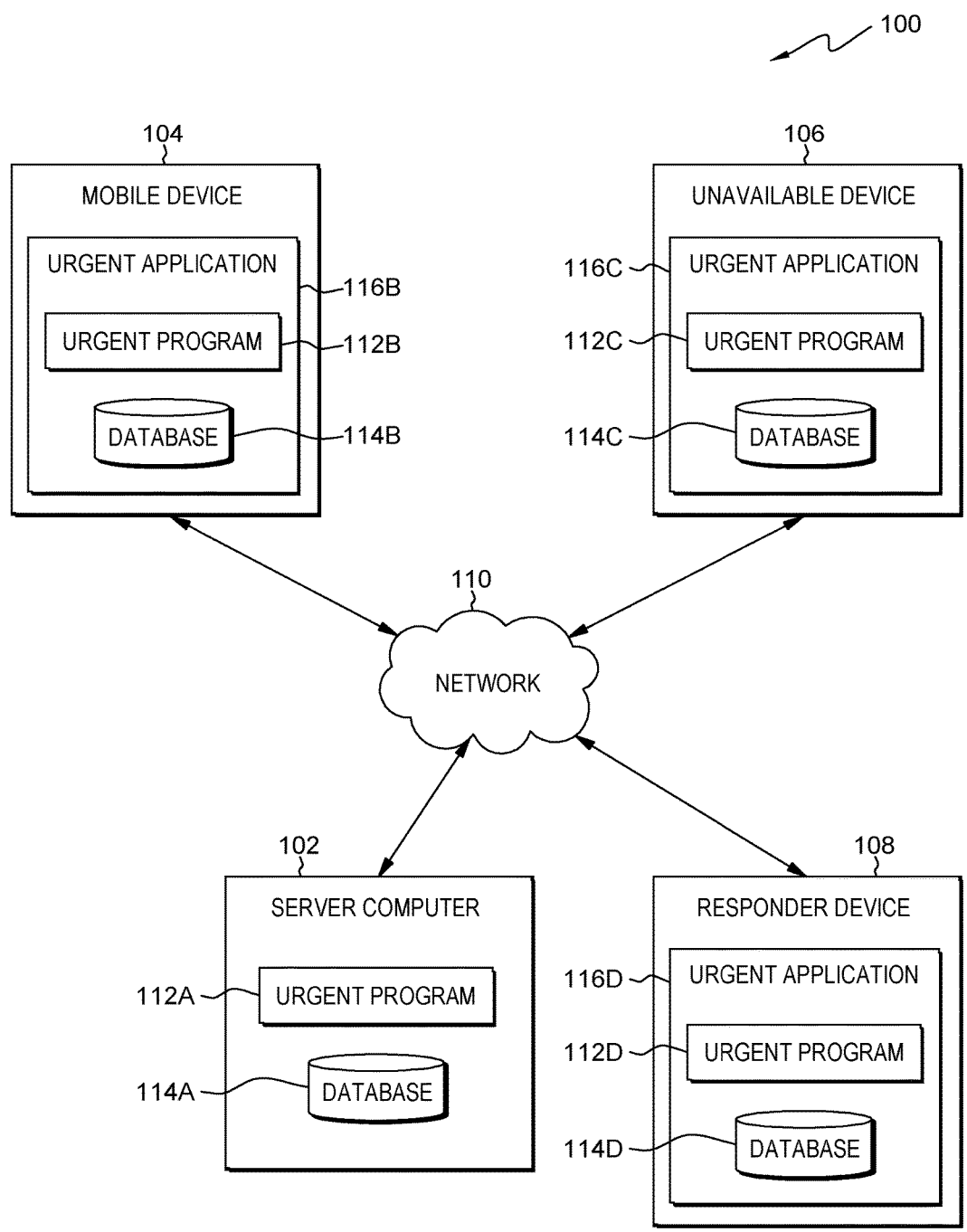
FIG. 1 is a block diagram of communications environment, in accordance with an embodiment of the present invention.

FIG. 1 is a functional block diagram illustrating a communications environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Communications environment 100 includes server computer 102, mobile device 104, unavailable device 106, responder device 108, all interconnected over network 110. Server computer 102, mobile device 104, unavailable device 106, and responder device 108 can each be a standalone computing device, a management server, a web server, a mobile computing device, or any other electronic device or computing system capable of receiving, sending, and processing data. In other embodiments, server computer 102, mobile device 104, unavailable device 106, and responder device 108 can each represent a server computing system utilizing multiple computers as a server system, such as in a cloud computing environment. In another embodiment, server computer 102, mobile device 104, unavailable device 106, and responder device 108 can each be a laptop computer, a tablet computer, a netbook computer, a personal computer (PC), a desktop computer, a personal digital assistant (PDA), a smart phone, or any programmable electronic device capable of communicating with various components and other computing devices (not shown) within communications environment 100 via network 110. In another embodiment, server computer 102, mobile device 104, unavailable device 106, and responder device 108 each represent a computing system utilizing clustered computers and components (e.g., database server computers, application server computers, etc.) that act as a single pool of seamless resources when accessed within communications environment 100. In some embodiments, server computer 102 and mobile device 104 are a single device. Server computer 102, mobile device 104, unavailable device 106, and responder device 108 may include internal and external hardware components capable of executing machine-readable program instructions, as depicted and described in further detail with respect to FIG. 4.

Server computer 102, mobile device 104, unavailable device 106, and responder device 108 each include a respective instance of an urgent program (e.g., urgent programs 112A-D) and a respective instance of a database (e.g., databases 114A-D). For example, server computer 102 includes urgent program 112A and database 114A. Mobile device 104 includes a separate instance of the urgent program and database, designated urgent program 112B and database 114B, while unavailable device 106 and responder device 108 includes urgent program 112C and database 114C, and urgent program 112D and database 114D, respectively.

In general, server computer 102, mobile device 104, unavailable device 106, and responder device 108 each facilitate communications between a number of mobile devices for the purposes of generating and sending urgent communications to unavailable users. For illustrative purposes, the following discussion is made with respect to mobile device 104 as being the device for the first party, unavailable device 106 as being the device for the second party, and responder device 108 as being the device of the third party, it being understood that any of the devices mentioned can function as a mobile device, an unavailable device, and a responder device that can communicate with other devices that are not shown. Stated another way, a mobile device described above can become an unavailable device when the user of the mobile device fails to respond to a message. Alternatively, a mobile device can become a responder device when the user of the mobile device responds to a request from urgent program 112.

In general, urgent program 112A is a program capable of determining a communication status of a communication, and relaying an urgent communication as a potential responder notification to a set of potential responders within a range based, at least in part, on an estimated location of a mobile device of the second party. In one embodiment, urgent program 112A may be an application, downloaded from an application store or a third-party provider. Urgent program 112A is depicted and described in further detail with respect to FIG. 2.

As used herein, a communication can be in the form of, but is not limited to, a phone call, a voice mail, a short message service (SMS), or a multimedia message service (MMS). As used herein, a communication includes any mutual communication link established between mobile device 104 and unavailable device 106, and any failed attempts by mobile device 104 to initiate a mutual communication link due to unavailable device 106 being ignored by the second party, due to unavailable device 106 being powered off, or due to unavailable device 106 being located outside the functional range of a platform carrying network 110. As used herein, a mutual communication link is a state of communication between two parties where the two parties are sending and receiving communications from the other party. For example, a mutual communication link occurs when a first party is able to send a first communication to a second party, the second party is able to receive the first communication, the second party is able to send a second communication in response to the first communication, and the first party is able to receive the second communication.

As used herein, a communication status is a designation of a communication that identifies whether the communication is urgent or not, and is based, at least in part, upon a set of communication logs between a first and a second party as described in greater detail later in the specification. In one embodiment, urgent program 112 determines a communication status of a communication sent by a first party via mobile device 104 when mobile device 104 is unable to establish a mutual communications link with a second party via unavailable device 106. For example, a first party attempts to call a second party from mobile device 104 to unavailable device 106, but the second party does not answer the call. Urgent program 112A then determines the communication status of the missed phone call from the first party.

In this embodiment, urgent program 112 estimates a set of locations for an unavailable device (e.g., unavailable device 106), determines a set of potential responders within a range using the estimated set of locations, and issues a potential responder notification to the set of potential responders, via responder device 108, to enable the third party to identify and alert the second party of the urgent communication as described in greater detail later in the specification. A range, as used herein, is a radius distance measured from a location that functions as a center. For example, urgent program 112A determines a location for unavailable device 106 and a range is 500 meters. Urgent program 112A determines that users within 500 meters of the determined location of unavailable device 106 are a set of potential responders.

As used herein, a first party is a user of mobile device 104 who sends a communication via mobile device 104 to unavailable device 106. In this embodiment, the communication sent by a first party may or may not cause unavailable device 106 to issue an alert to the second party, wherein the alert issued by unavailable device 106 is a mode of gaining the attention of a second party. For example, an alert can be, but is not limited to, a ring, a user selected ringtone, a buzz, or a vibration.

As used herein, a second party is a user of unavailable device 106. In this embodiment, the second party is always unavailable for the purposes of this discussion, and may be unavailable for any variety of reasons. For example, a second party can fail to acknowledge an alert when the second party is away from unavailable device 106, or when unavailable device 106 is turned off, is lacking power to operate, or is on silent mode such that unavailable device 106 can receive communications but the alerts are disabled.

As used herein, a third party is a user of responder device 108. A third party is a user that has urgent program 112D installed on responder device 108, is not a first party or second party, and is determined by urgent program 112D to be within a range of an estimated location of unavailable device 106. A third party is also commonly referenced as a potential responder or a responder. A potential responder is a user of responder device 108 that urgent program 112D selects as a proxy who will potentially relay an urgent communication to a second party. A responder is a user of responder device 108, and is someone who successfully relays an urgent communication to the second party.

Database 114A is a repository for data used by urgent program 112A. Database 114A can be implemented with any type of storage device capable of storing data and configuration files that can be accessed and utilized by server computer 102, such as a database server, a hard disk drive, or a flash memory. Database 114A stores a set of communication logs that correspond to phone calls and text messages between mobile device 104 and unavailable device 106, wherein the set of communication logs can include, but is not limited to, a communication timestamp of a communication between the first and the second party, and content of the communication (e.g., recorded speech of a voicemail, the written text contained in a SMS or MMS, etc.) For example, database 114 stores a list of application users that contains, at least, contact information that allows communication to responder device 108 corresponding to a set of application users (e.g., a phone number to reach responder device 108, a link to a social media account of the application user) that are registered to participate as a potential responder, and a current location of responder device 108 corresponding to the set of application users. Database 114A stores a range corresponding to an urgent communication. Database 114A also stores a default range, wherein the default range is a predetermined range. Other instances of database 114A can be created to have local instances of database 114A on user devices (e.g., mobile device 104, unavailable device 106 and responder device 108).

Mobile device 104, unavailable device 106, and responder device 108 each include respective urgent programs (e.g., urgent programs 112B-D) and databases (e.g., databases 114B-D). In this embodiment, urgent programs 112B-D and database 114B-D are part of an urgent application, designated urgent applications 116B-D, respectively. In general, an urgent application (e.g., urgent application 116B-D) is a program serving as an operating platform for urgent program 112A, and provides a user interface for mobile device 104, unavailable device 106, and responder device 108. In this embodiment, an urgent application (e.g., urgent application 116B) may be an application, downloaded from an application store or a third-party provider. For example, a user downloads the urgent application (e.g., urgent application 116B), which includes an instance of urgent program 112A (e.g., urgent program 112B), onto mobile device 104. At a later time, the user attempts to call a friend using mobile device 104, but the call is missed. As a result of the call being missed, urgent program 112B is triggered, determines the call is urgent, and sends a potential responder notification to a set of potential responders. The user can then manage the potential responder notification using urgent application 116B to customize a message to be included with the potential responder notification, monitor the status of the potential responder notification (e.g., monitor time elapsed since the missed call), monitor the status of urgent program 112B while it determines a set of potential responders (e.g., the user can monitor how far the range is currently set), and can allow the user to terminate the operations carried out by urgent program 112B by confirming the friend is now able to communicate with the user, or the user simply wishes to cancel the operations carried out by urgent program 112B (e.g., the user decides the phone call was not urgent).

In another example, a user has a phone that has urgent application 116D installed, and the phone receives a potential responder notification. Urgent application 116D serves as an interface for the user by providing details of the potential responder notification, and monitor the status of other active potential responder notifications the user may have received. In another embodiment, urgent application 116D can function as a stand-alone operating platform that communicates with urgent program 112A.

In another embodiment, urgent application 116B-D generates respectively a user interactive interface for mobile device 104, unavailable device 106, and responder device 108 to allow a user to interact with urgent application 116B-D respectively. In general, urgent application 116B-D can generate a user interface having one or more graphical icons the user can interact with and operate an incentive system based upon user awards for various degrees of participation in relaying an urgent communication to a second party. For example, urgent application 116D can include graphical icons that, when selected, can enable a user to respond to an urgent message, display an account balance, redeem the account balance, etc. as described in greater detail with regard to FIG. 6.

In one embodiment, urgent application 116B-D also operates an incentive system based upon user awarded points for various degrees of user participation in relaying an urgent communication to a second party. User participation that is awarded points can include, but is not limited to, the user installing urgent application 116B-D respectively onto mobile device 104, unavailable device 106, and responder device 108; the user installing urgent application 116B-D onto the social media platform utilized by the user; the user participating as a potential responder by allowing urgent application 116B-D to operate passively on mobile device 104, unavailable device 106, and responder device 108, wherein passive operation is when a) the user is not actively interacting with urgent application 116B-D, b) the device that serves as responder device 108 is registered among a list of application users stored on database 114, and c) the device is available to receive an alert issued by mobile device 104 other than the device itself; and the user participates as a responder for successfully relaying an urgent communication to a second party. In a further embodiment, points accrued by a user can then be used to purchase discount offers for sponsored goods and services. In alternative embodiment, urgent application 116B-D operates an incentive system based upon a microtransaction system where a first party pays a service to a responder for various degrees of user participation.

Network 110 can be, for example, a telecommunications network, a local area network (LAN), a wide area network (WAN), such as the Internet, or a combination of the three, and can include wired, wireless, or fiber optic connections. Network 110 can include one or more wired and/or wireless networks that are capable of receiving and transmitting data, voice, and/or video signals, including multimedia signals that include voice, data, and video information. In general, network 110 can be any combination of connections and protocols that will support communications among server computer 102, mobile device 104, unavailable device 106, responder device 108, and other computing devices (not shown) within communications environment 100.

Figure 2:
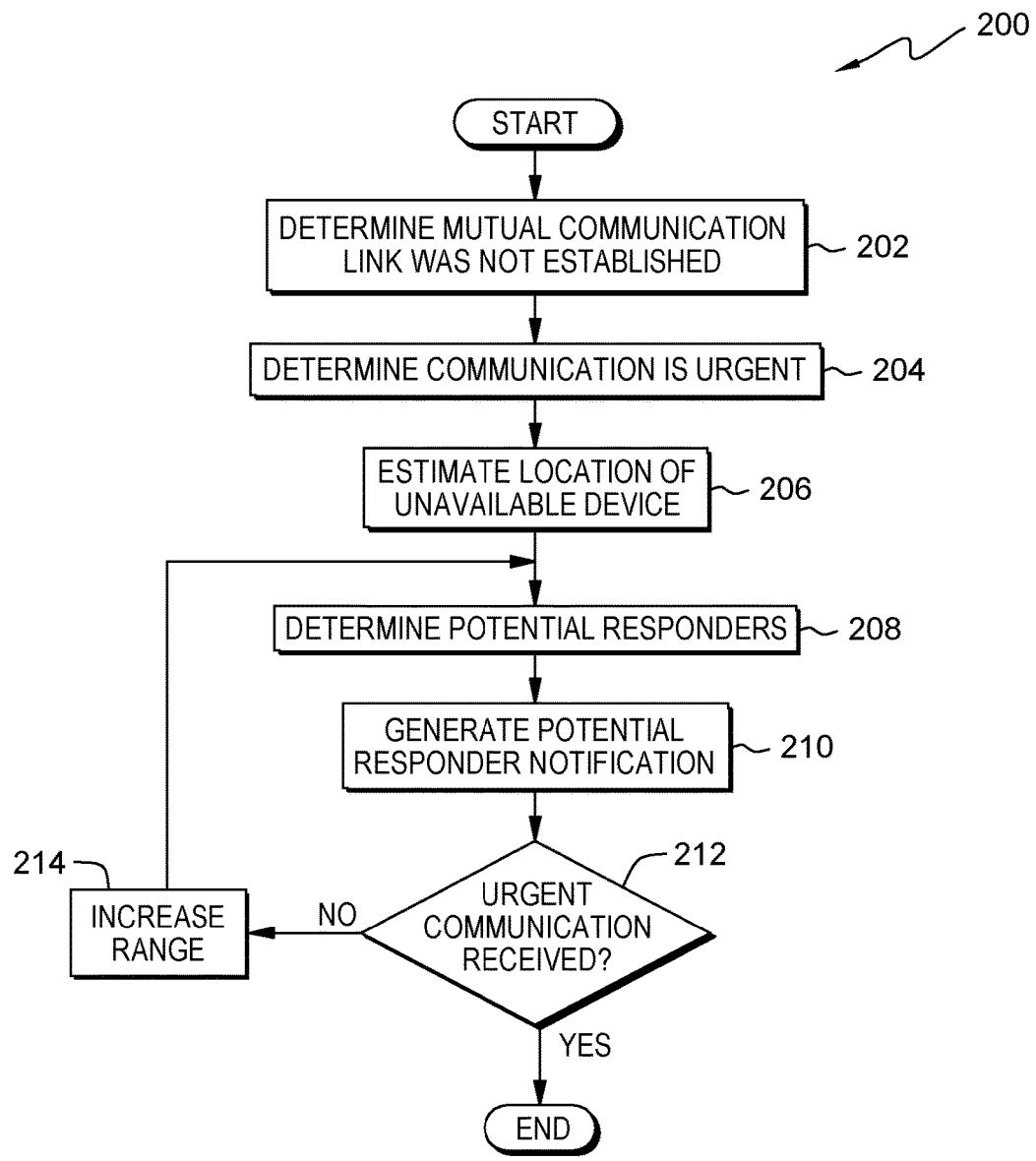
FIG. 2 is a flowchart depicting operational steps for delivering an urgent communication to an unavailable second party, in accordance with an embodiment of the present invention.

FIG. 2 is a flowchart 200 depicting operational steps for delivering an urgent communication to an unavailable second party, in accordance with an embodiment of the present invention. For illustrative purposes, the following discussion is made with respect to urgent program 112A performing the operational steps of flowchart 200, it being understood that any instance of the urgent program (e.g., urgent program 112A-D) can perform the operational steps of flowchart 200 to deliver an urgent communication to an unavailable second party.

In step 202, urgent program 112A determines a mutual communication link was not established between mobile device 104 and unavailable device 106. In this embodiment, urgent program 112 determines a mutual communication link was not established by continuously monitoring the set of communication logs of mobile device 104 (with permission from a user of mobile device 104), and determining that unavailable device 106 did not accept the communication, is unresponsive, or is unresponsive after a predetermined period of time. For example, a first party uses mobile device 104 to call unavailable device 106, but a second party does not answer the call on unavailable device 106, resulting in the first party ending the call by hanging up mobile device 104. Urgent program 112A monitors the call logs of mobile device 104, and determines that, since unavailable device 106 did not accept the call, a mutual communication link was not established. In another example, a first party uses mobile device 104 to send a text message to unavailable device 106, but unavailable device 106 does not provide to mobile device 104 a read receipt confirming the second party received the text after one hour has passed since mobile device 104 sent the message to unavailable device 106. Urgent program 112A monitors the message logs of mobile device 104, and determines that, since mobile device 106 did not receive the read receipt from unavailable device 106, a mutual communication link was not established.

In another embodiment, urgent program 112A determines a mutual communication link was not established by continuously monitoring a set of communication logs collected from a network service provider of network 110 (with permission of a user of mobile device 104), wherein the set of communication logs are stored on database 114A. For example, a user uses mobile device 104 to attempts to call unavailable device 106, but unavailable device 106 is outside the functional range of network 110 or is powered off. A network service provider of network 110 receives the call from mobile device 104, but is unable to locate unavailable device 106 to establish a connection to relay the call. The network service provider records a communication log to database 114A corresponding to the received call, wherein urgent program 112A determines from the communication log a mutual communication link was not established.

In instances where a mutual communication link is established, urgent program 112A records the mutual communication link and records a communication log to database 114 corresponding to communication (e.g., the received call and/or otherwise responded to communication). For example, where a communication link is established (e.g., via a received phone call), urgent program 112B can record the received phone call into a communication log stored in database 114B for the parties involved with the phone call (e.g., the devices associated with the call and the devices respective users).

In step 204, urgent program 112A determines a communication is urgent. In this embodiment, urgent program 112A determines a communication is urgent by acquiring the set of communication logs between mobile device 104 and unavailable device 106, determining whether a communication is "normal" or "abnormal", and flagging the communication received as an "abnormal" communication. As used herein, a communication that is normal is a communication that is made within a time window of a communication pattern, based, at least in part, on the set of communication logs. Likewise, a communication that is abnormal is a communication that is made outside a time window of a communication pattern as described in greater detail with regard to FIG. 3, flowchart 300.

In step 206, urgent program 112A estimates a set of possible locations where unavailable device 106 is located. In this embodiment, urgent program 112A estimates a set of possible locations where unavailable device 106 is located by acquiring a coordinate of position determined by a global positioning system (GPS) operational on unavailable device 106, or by acquiring an approximate coordinate of position determined by cellular tower triangulation.

In another embodiment, urgent program 112A estimates a set of possible locations where unavailable device 106 is located by analyzing recent check-ins on social media platforms that detail a recent location of the second party. For example, a second party announces on a social media platform that the second party is currently at a gym. Several hours later, unavailable device 106 receives a call, but the second party fails to answer. Urgent program 112B determines the call is an urgent communication, and proceeds to estimate a set of possible locations where unavailable device 106 is located. Urgent program 112B checks the social media platform of the second party, finds the check-in of the second party stating the second party is at the gym, and selects the location of the gym as a location for the set of possible locations.

In another embodiment, urgent program 112 estimates a set of locations by analyzing travel patterns recorded by unavailable device 106. For example, a second party enables unavailable device 106 to log travel patterns onto database 114A. Later, unavailable device 106 receives a call, but the second party fails to answer. Urgent program 112A determines the call is an urgent communication, and proceeds to estimate a set of locations where unavailable device 106 is located. Urgent program 112A acquires travel patterns from database 114A, and determines that the second party typically spends his time at gym at the time when the urgent communication was received. Urgent program 112A selects the location of the gym as a location for the set of possible locations.

In another embodiment, urgent program 112A estimates a set of locations by identifying the second party by using facial recognition software. For example, a building with a surveillance system can allow continuous or periodic transmission of recorded footage access for urgent program 112A, and is installed with a facial recognition software, such that if urgent program 112A detects the second party by using facial recognition software, urgent program 112A sets the location of the building as a location in the set of possible locations.

In a further embodiment, urgent program 112A can repeat any of the aforementioned embodiments to determine a location of a set of possible locations of unavailable device 106, in order to identify other locations to be used as part of the set of locations.

In step 208, urgent program 112A determines a set of potential responders. In this embodiment, urgent program 112A determines a set of potential responders by acquiring a list of application users who have a potential responder application installed on responder device 108 or on social media platform of the application users, selecting the list of application users who are within a range of the set of locations, and assigning the selected list of application users as the set of potential responders as described in greater detail with regard to FIG. 4, flowchart 400. For example, urgent program 112B can identify five users within a range of the estimated location of the unavailable device 106 as potential responders of the set of potential responders. In another example, urgent program 112B can also access social media platforms of the user of the unavailable device 106, and selects users connected with the user of the unavailable device 106 as potential responders of the set of potential responders.

In step 210, urgent program 112A generates a potential responder notification to the set of potential responders. In this embodiment, urgent program 112A generates a potential responder notification by sending the potential responder notification from server computer 102, through network 110, to a set of responder device 108 corresponding to the set of potential responders. A potential responder notification contains information enabling the potential responder to identify the second party and to relay a basic description of the urgent communication to the second party, and can include, but is not limited to, an image of the second party to locate, information regarding the first party (e.g., name of the first party, the relation between the first and second party, contact information of the first party), an abstract of the urgent communication (e.g., "phone rang ten times in five minutes from a single number", "text message: help me; flat tire"), and metadata regarding the urgent communication.

In step 212, urgent program 112A determines whether the urgent communication was received. In this embodiment, urgent program 112A determines whether the urgent communication was received by the second party by periodically monitoring a confirmation status after a period of time, wherein the confirmation status is based upon a user selection inputted using mobile device 104, unavailable device 106, or both. A period of time is a predetermined unit of time (e.g., 15 minutes, 30 minutes, 1 hour, etc.) measured after issuing the alert to the set of potential responders that, upon expiration of the period of time, triggers urgent program 112A to check the confirmation status. For example, urgent program 112B issues an alert to a set of potential responders. After a period of time of 15 minutes, urgent program 112B checks the confirmation status. A confirmation status has two states: a) not confirmed, wherein neither the first or second party has confirmed the urgent communication was received; and b) confirmed, wherein either the first party, second party, or both parties has confirmed on mobile device 104 or unavailable device 106 that the urgent communication was received.

If, in step 212, urgent program 112A determines that the urgent communication was not received, urgent program 112 increases the range in order to redetermine a set of potential responders (step 214). In this embodiment, urgent program 112 increases the range in proximity to unavailable device 106. For example, urgent program 112B issues an alert to a set of potential responders. In the event the first party, second party, or both parties confirm on either mobile device 104 or unavailable device 106 within the period of time that the urgent communication was received by the second party, urgent program 112B determines confirmation after the period of time has expired by checking the confirmation status, determines the confirmation status is confirmed, and urgent program 112B ends. In the event the first party, second party, or both parties confirm on either mobile device 104 or unavailable device 106 within the period of time that the urgent communication was received by the second party, urgent program 112B determines confirmation after the period of time has expired, determines the urgent communication was received, and then ends. In the event either the first party or the second party do not confirm on either mobile device 104 or unavailable device 106 within the period of time that the urgent communication was received by the second party, urgent program 112B determines confirmation after the period of time has expired, determines that the urgent communication was not received, and then proceeds to increase the range for redetermining a set of potential responders.

In step 214, responsive to determining that the urgent communication was not received, urgent program 112A increases the range for redetermining a set of potential responders. In this embodiment, urgent program 112A increases the range by adding an increment of distance to the range, and then proceeds to determine a set of potential responders based upon the range (step 208). For example, urgent program 112B determines a set of potential responders based upon a range of 50 meters, and issues an alert to the set of potential responders. In this example, neither the first party or second party confirm the urgent communication was received by the second party after a period of time after issuing the alert to the set of potential responders. Urgent program 112B can then increase the range by 50 meters, thus making a range of 100 meters for the urgent communication, and stores the range on database 114B. Then, urgent program 112B determines a set of potential responders based upon the range of 100 meters, and issues an alert to the set of potential responders. This process of urgent program 112 adding an increment of distance to the range after every period of time the confirmation status remains unconfirmed (i.e., that urgent communication was not received) effectively increases the set of potential responders in order to increase the possibility of one of the potential responders locating the second party.

If, in step 212, urgent program 112A determines that the urgent communication was received urgent program 112A ends. Accordingly, by performing the operational steps of flowchart 200, a user of an unavailable device can be otherwise reached and notified of an urgent communication without the aid of the user's device. Urgent program 112A can then transmit a notification to urgent application 116 to award points to the user who responded to the urgent communication, as described in greater detail with regard to FIG. 5.

Figure 3:
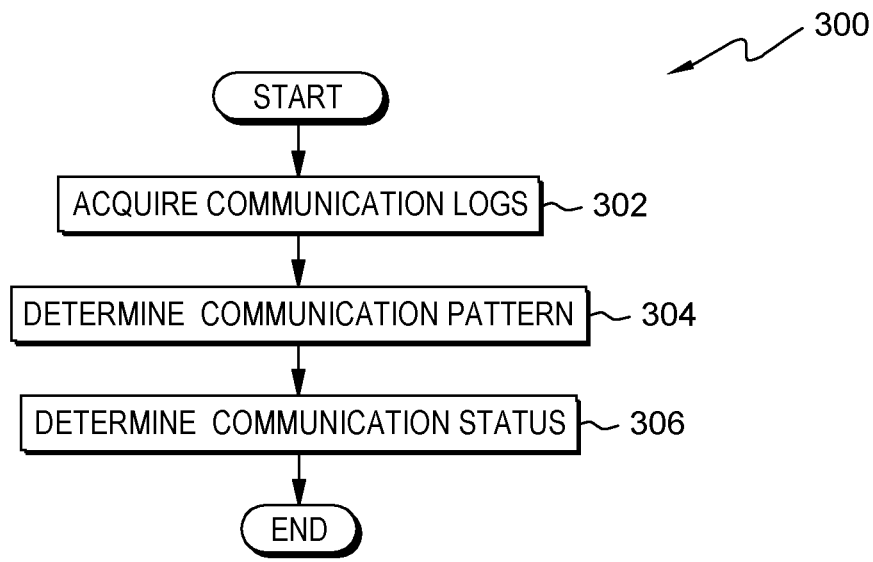
FIG. 3 is a flowchart depicting operational steps of determining an urgent communication, in accordance with an embodiment of the present invention.

FIG. 3 is flowchart 300 depicting operational steps of determining an urgent communication, in accordance with an embodiment of the present invention.

In step 302, urgent program 112 acquires a set of communication logs. In this embodiment, urgent program 112 acquires a set of communication logs by accessing the set of communications logs between mobile device 104 and unavailable device 106 from database 114. For example, urgent program 112B acquires the call logs and text message logs that were recorded between mobile device 104 and unavailable device 106 by accessing database 114B where the call logs and text messages logs are stored. In another embodiment, urgent program 112 can acquire a set of communication logs from other databases (not shown) to analyze communication patterns. For example, urgent program 112B can request access to, and subsequently be given permission to access, other electronic based communication logs (e.g., web based services that offer audio, visual, and text messaging features). In further embodiments, urgent program 112 can link accounts of respective users across different platforms of communications. For example, urgent program 112B can link web based messaging services accounts of a user to the user's mobile device and analyze a communication pattern between all of the user's accounts.

In step 304, urgent program 112 determines a communication pattern. In this embodiment, urgent program 112 determines a communication pattern by using a time series analysis of the set of communication logs to determine a normal pattern of communication. The time series analysis can be, but is not limited to, a k-nearest neighbor calculation, a standard deviation calculation, a clustering of communication times, or any combination listed thereof. A normal pattern is a time window based, at least in part, on the time series analysis of the set of communication logs that, when mobile device 104 sends a communication within the time window, the communication is designated as a "normal" communication. Likewise, when mobile device 104 sends a communication outside the time window, the communication is designated as an "abnormal" communication. For example, mobile device 104 sends communications to unavailable device 106 generally during business hours. Urgent program 112B acquires the set of communication logs of mobile device 104, and uses a time series analysis of the set of communication logs to determine that a normal pattern of communication between mobile device 104 and unavailable device 106 has a time window during business hours.

In step 306, urgent program 112 determines a communication status of the communication. In this embodiment, urgent program 112 determines a communication status of the communication sent by mobile device 104 by checking the communication against the communication pattern to determine if the communication is "normal" or "abnormal". If urgent program 112 determines the communication status of the communication is "abnormal", then urgent program 112 deems the communication an urgent communication. For example, after business hours have ended, mobile device 104 attempts to call unavailable device 106, but a mutual communication link is not established. Urgent program 112B determines that a normal pattern of communication between mobile device 104 and unavailable device 106 has a time window during business hours. Urgent program 112B checks the communication against the communication pattern, determines the communication was made outside of business hours and is subsequently "abnormal", then deems the communication as an urgent communication.

In another embodiment, urgent program 112 determines a communication status of the communication by using a text analysis of the communication, wherein the text analysis of the communication can be an analysis that monitors for keywords and/or phrases in the communication that are predetermined to be an urgent communication. Examples of text analysis can include natural language processing (e.g., sentence splitting, tokenization, POS tagging, chunking, dependency parsing, and anaphora resolution, etc.) to process the semantics of the text. For example, urgent program 112B has predetermined that "help me" and "where are you?" are keywords and phrases that are an urgent communication. Mobile device 104 sends a text message to unavailable device 106 containing the phrase "where are you?", but unavailable device 106 does not send a read receipt of the text message after an hour has passed since the text was sent. Urgent program 112B determines that a mutual communication link was not established, performs a text analysis of the text message, detects the phrase "where are you?", and deems the text message an urgent communication. In other embodiments, urgent program 112 provides a capability to the user to add to a list of predetermined words and/or phrases that help designate a communication as "urgent".

Figure 4:
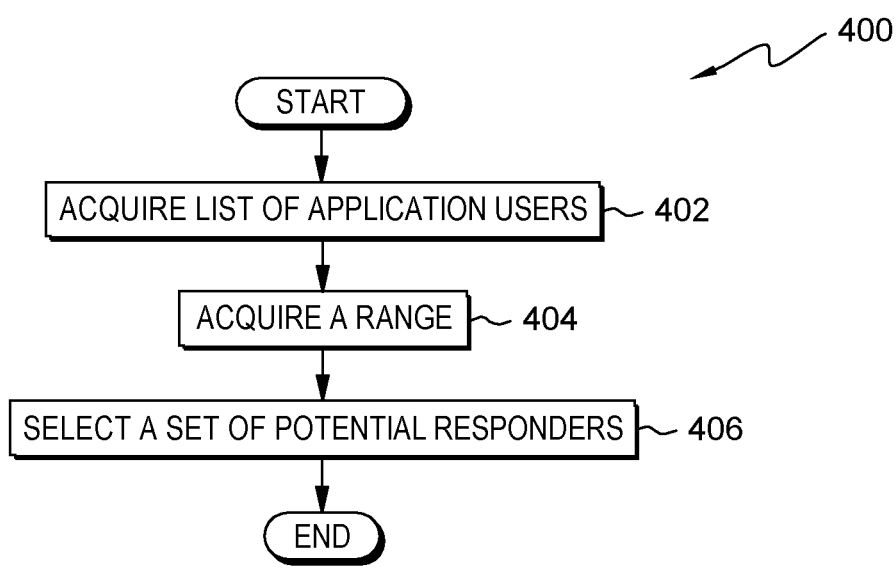
FIG. 4 is a flowchart depicting operational steps of determining a set of potential responders, in accordance with an embodiment of the present invention.

FIG. 4 is a flowchart 400 depicting operational steps of determining a set of potential responders, in accordance with an embodiment of the present invention.

In step 402, urgent program 112 acquires a list of application users. In this embodiment, urgent program 112 acquires a list of application users by accessing the list of application users stored on database 114, wherein the list of application users contains, at least, contact information of responder device 108 and the current location of responder device 108. For example, a set of application users who wish to participate as a potential responder in assisting in relaying an urgent communication to a second party register responder device 108 of an application user, and subsequently have contact information of the application user stored on database 114A as part of a list of application users. While responder device 108 is active, a current location of responder device 108 is also stored on database 114A. Then, in the event urgent program 112 determines a communication is urgent and has estimated a location of an unavailable device, urgent program 112B acquires the list of application users from database 114A.

In step 404, urgent program 112 acquires a range. In this embodiment, urgent program 112 acquires a range by acquiring the range stored on database 114. For example, for an urgent communication, database 114B has stored a range of 100 meters. Urgent program 112B acquires the range of 100 meters. In another embodiment, if urgent program 112 cannot acquire a range from database 114 for an urgent communication because the range is not stored on database 114, then urgent program 112 acquires a default range from database 114 and stores it as the range corresponding to the urgent communication. For example, urgent program 112B determines a communication is urgent and attempts, for the first time, to determine a set of potential responders for the urgent communication. Since this is the first attempt that urgent program 112B tries to find a responder, a range has not yet been stored on database 114B corresponding to the urgent communication. Urgent program 112B determines the range is not stored on database 114B, acquires a default range of 50 meters from database 114B, and stores 50 meters as the range corresponding to the urgent communication on database 114B.

In step 406, urgent program 112 selects a set of potential responders. In this embodiment, urgent program 112 selects a set of potential responders by selecting a set of application users from the list of application users that are at or within the range of a set of locations estimated as the location of unavailable device 106. For example, a list of application users includes users A, B, and C. Urgent program 112B acquires the list of application users and current locations of the application users. Urgent program 112B estimates that the location of unavailable device 106 is 25 meters from user A, 50 meters from user B, and 100 meters from user C. Urgent program 112B also acquires a range of 50 meters from database 114B. Urgent program 112 selects user A and user B as the set of potential responders since user A and user B are at or within the range of 50 meters, but not user C who is greater than 50 meters from the location of unavailable device 106.

In yet other embodiments, urgent program 112 can select a set of potential responders without regard to the range of the set of estimated locations for unavailable device 106. In those embodiments, urgent program 112 can rely on the user's social media platforms to identify potential responders. For example, urgent program 112B can identify from the user's social media platforms that person A is a friend that interacts regularly with the user. In this embodiment, urgent program 112 identifies that person A interacts regularly by scanning through the user's social media web page and identifying a list of written communication between the user and person A as well as photographs of person A and the user. Urgent program 112 can then compare those instances of interactions between person A and the user to a predetermined threshold that indicates a level of closeness between the two. Responsive to identifying that the interactions between person A and the user are above the threshold, urgent program 112 can then identify that person A is a "close friend" to the user. In these situations, urgent program 112 can then choose to select person A as the potential responder that has the highest chance of establishing communication with the user (who is now unavailable) as opposed to the potential responders within the range of a set of locations estimated as the location of unavailable device 106. In yet other embodiments urgent program 112 can choose to select any number of possible combinations between the user's social media connections and potential responders within the range of the set of locations estimated as the location of unavailable device 106.

Figure 5:
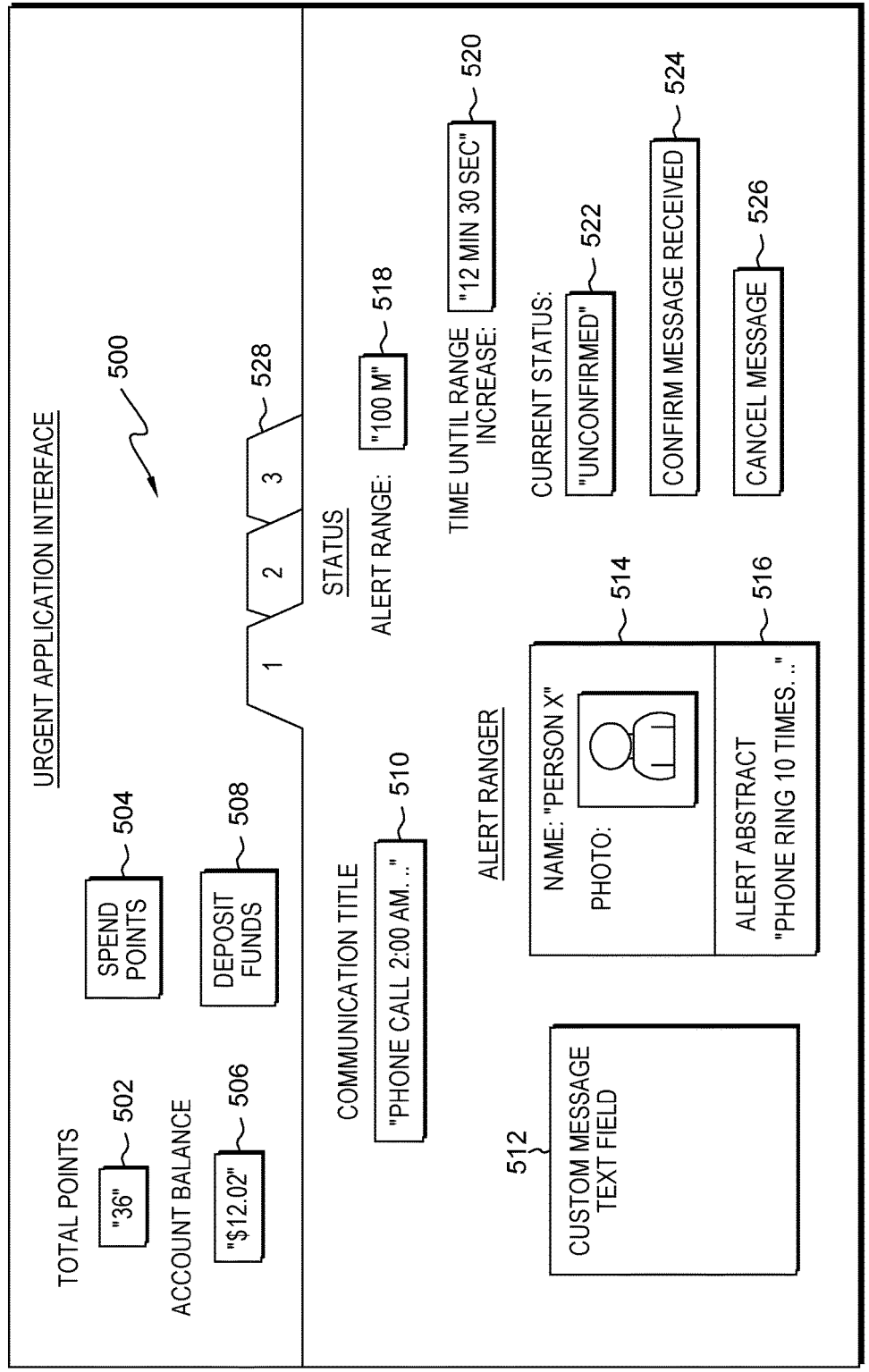
FIG. 5 is a screen shot example of an interactive graphical user interface for an urgent application, in accordance with an embodiment of the present invention.

FIG. 5 is an example screen shot of an interactive graphical user interface 500 for an urgent application 116, in accordance with an embodiment of the present invention.

In general, interactive graphical user interface 500 includes one or more graphical icons, one or more interactive graphical icons, and text input fields that are viewable to the user, and allows the user to interact with urgent program 112. For example, interactive graphical user interface 500 can display an indication of accrued points which displays the total number of accrued points awarded to the user for varying degrees of participation. In this example, text field 502 displays accrued points. In another example, interactive graphical user interface 500 can display an interactive icon that allows a user to select a method of spending accrued points. In this example, interactive icon 504 opens a list of various methods a user can spend accrued points. In another example, interactive graphical user interface 500 can display an indication of an account balance of the user. In this example, text field 506 displays the account balance of the user. In another example, interactive graphical user interface 500 can display an interactive icon that allows a user to deposit or withdrawal funds into the account of the user. In this example, interactive icon 508 opens a menu that allows the user to deposit or withdrawal funds.

In another embodiment, interactive graphical user interface 500 displays a series of urgent message indicators, interactive icons, and interactive text fields pertaining to an urgent message status. For example, interactive graphical user interface 500 can display a designated identification title for an urgent communication. In this example, text field 510 displays the title of an urgent communication titled "phone call 2:00 am to person X". In another example, graphical user interface 500 can display an interactive text field that allows a first party to input a custom message to be included as part of a potential responder notification. In this example, interactive text field 512 is an interactive text field for a custom message. In another example, interactive graphical user interface 500 can display a text field and icon that display default details for identifying a second party, such as the name of the second party and a photograph of the second party. In this example, text field and icon 514 displays default details of a second party. In another example, interactive graphical user interface 500 can display details pertaining to the reason why a communication was deemed as an urgent communication (e.g., "phone rang 10 times in 5 minutes from a single number", "text message contains 'help, flat tire'"). In this example, text field 516 displays details of an urgent communication. In another example, interactive graphical user interface 500 can display a range currently being utilized by urgent program 112 in issuing a potential responder notification to a set of potential responders. In this example, text field 518 displays a range. In another example, graphical user interface 500 can display time remaining until a period of time expires that further signifies when a set of potential responders will be updated based upon an incremental increase in a range triggered in step 212. In this example, text field 520 displays an amount of time until a period of time expires. In another example, interactive graphical user interface 500 can display a status identifying whether the second party has received the urgent communication or not. In this example, text field 522 displays a confirmation status. In another example, interactive graphical user interface 500 can display an interactive icon that allows a first party and/or a second party to confirm the second party received the urgent communication, where then the user is subsequently prompted to identify a responder among a set of potential responders that assisted in relaying the urgent communication. In this example, interactive icon 524 allows a first and/or a second party to confirm the urgent communication was received. In another example, interactive graphical user interface 500 can display an interactive icon that allows a first party to cancel an attempt made by urgent program 112 to relay an urgent message to a second party. In this example, interactive icon 526 allows a first party to cancel urgent program 112 in relaying an urgent communication. In yet another example, interactive graphical user interface 500 can display an interactive icon that allows a user to alternate views of other potential responder notifications corresponding to other urgent communications. In this example, interactive icon 528 allows a user to select a potential responder notification to view.

Figure 6:
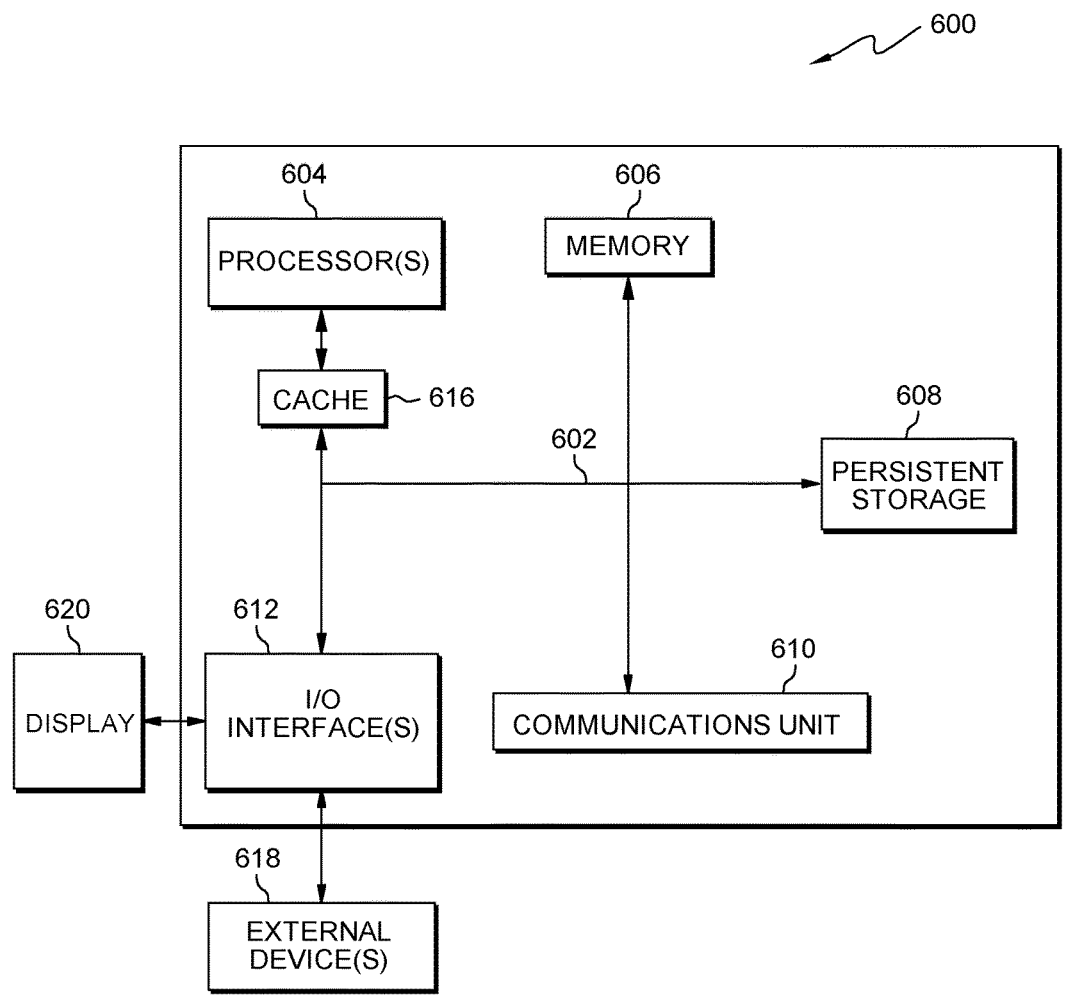
FIG. 6 depicts a block diagram of components of the computing systems of FIG. 1, in accordance with an embodiment of the present invention.

FIG. 6 depicts a block diagram of components of the computing systems 600 of FIG. 1, in accordance with an embodiment of the present invention. It should be appreciated that FIG. 6 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computing systems 600 includes communications fabric 602, which provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of computer processor(s) 604 by holding recently accessed data, and data near accessed data, from memory 606.

Urgent application 116 and urgent program 112 may be stored in persistent storage 608 and in memory 606 for execution by one or more of the respective computer processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Urgent application 116 and urgent program 112 may be downloaded to persistent storage 608 through communications unit 610.

I/O interface(s) 612 allows for input and output of data with other devices that may be connected to server computer 102. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention, e.g., Urgent application 116 and urgent program 112, can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    determining a mutual communication link was not established for a communication between a first electronic device and a second electronic device, wherein the first electronic device is associated with a first user and the second electronic device is associated with a second user;
    determining the communication between the first electronic device and the second electronic device is abnormal;
    estimating a set of possible locations for the second electronic device; and
    determining a set of potential responders to alert the second user based, at least in part, on: (i) the set of possible locations for the second electronic device and (ii) identifying respective users whose interactions with the second user exceed a predetermined threshold for interactions based, at least in part, on:
        accessing the second user's social media accounts;
        identifying users linked to the second user's social media accounts;
        identifying respective interactions between the second user and each of the users linked to the second user's social media accounts; and
        comparing each of the users identified interactions with the second user against the predetermined threshold for interactions.

2. The computer-implemented method of claim 1, further comprising:
    generating a notification for the set of potential responders that comprises, a date of the communication, a time that the communication was sent, identification credentials for the second user, and a custom message that the first user includes for a potential responder of the set of potential responders to deliver to the second user and additional identification information regarding the second user.

3. The computer-implemented method of claim 2, further comprising:
    sending the notification to the set of potential responders; and
    determining that the custom message was received by the second user.

4. The computer-implemented method of claim 2, further comprising:
    responsive to determining that the custom message was not received by the second user, increasing a range in proximity to the second electronic device that is used to determine a new set of potential responders;
    determining the new set of potential responders based on the increased range in proximity to the second electronic device; and
    sending the notification to the new set of potential responders.

5. The computer-implemented method of claim 1, wherein determining the communication between the first electronic device and the second electronic device is abnormal comprises:
    accessing communication logs between the first user and the second user;
    determining a communication pattern between the first user and the second user using the accessed communication logs, wherein the communication pattern is determined using a k-nearest neighbor calculation; and
    identifying, the communication as an abnormal communication based upon the determined communication pattern.

6. The computer-implemented method of claim 1, wherein determining the set of potential responders to alert the second user is further based, at least in part, on:
    retrieving a range within a proximity of the second electronic device; and
    selecting users within the range as the set of potential responders to alert the second user.

7. A computer program product comprising:
    one or more computer readable storage media and program instructions stored on the one or more computer readable storage media, the program instructions comprising:
    program instructions to determine a mutual communication link was not established for a communication between a first electronic device and a second electronic device, wherein the first electronic device is associated with a first user and the second electronic device is associated with a second user;
    program instructions to determine the communication between the first electronic device and the second electronic device is abnormal;
    program instructions to estimate a set of possible locations for the second electronic device; and
    program instructions to determine a set of potential responders to alert the second user based, at least in part, on: (i) the set of possible locations for the second electronic device and (ii) identifying respective users whose interactions with the second user exceed a predetermined threshold for interactions based, at least in part, on:
        program instructions to access the second user's social media accounts;
        program instructions to identify users linked to the second user's social media accounts;

program instructions to identify respective interactions between the second user and each of the users linked to the second user's social media accounts; and program instructions to compare each of the users identified interactions with the second user against the predetermined threshold for interactions.

8. The computer program product of claim 7, wherein the program instructions stored on the one or more computer readable storage media further comprise:

program instructions to generate a notification for the set of potential responders that comprises, a date of the communication, a time that the communication was sent, identification credentials for the second user, and a custom message that the first user includes for a potential responder of the set of potential responders to deliver to the second user and additional identification information regarding the second user.

9. The computer program product of claim 8, wherein the program instructions stored on the one or more computer readable storage media further comprise:

program instructions to send the notification to the set of potential responders; and program instructions to determine that the custom message was received by the second user.

10. The computer program product of claim 8, wherein the program instructions stored on the one or more computer readable storage media further comprise:

program instructions to, responsive to determining that the custom message was not received by the second user, increase a range in proximity to the second electronic device that is used to determine a new set of potential responders;

program instructions to determine the new set of potential responders based on the increased range in proximity to the second electronic device; and program instructions to send the notification to the new set of potential responders.

11. The computer program product of claim 7, wherein the program instructions to determine the communication between the first electronic device and the second electronic device is abnormal comprise:

program instructions to access communication logs between the first user and the second user;

program instructions to determine a communication pattern between the first user and the second user using the accessed communication logs, wherein the communication pattern is determined using a k-nearest neighbor calculation; and program instructions to identify the communication as an abnormal communication based upon the determined communication pattern.

12. The computer product of claim 7, wherein the program instructions to determine the set of potential responders to alert the second user is further based, at least in part, on:

program instructions to retrieve a range within a proximity of the second electronic device; and program instructions to select users within the range as the set of potential responders to alert the second user.

13. A computer system comprising:
one or more computer processors;
one or more computer readable storage media; and
program instructions stored on the one or more computer readable storage media for execution by at least one of the one or more processors, the program instructions comprising:

program instructions to determine a mutual communication link was not established for a communication between a first electronic device and a second electronic device, wherein the first electronic device is associated with a first user and the second electronic device is associated with a second user;

program instructions to determine the communication between the first electronic device and the second electronic device is abnormal;

program instructions to estimate a set of possible locations for the second electronic device; and program instructions to determine a set of potential responders to alert the second user based, at least in part, on: (i) the set of possible locations for the second electronic device and (ii) identifying respective users whose interactions with the second user exceed a predetermined threshold for interactions based, at least in part, on:

program instructions to access the second user's social media accounts;

program instructions to identify users linked to the second user's social media accounts;

program instructions to identify respective interactions between the second user and each of the users linked to the second user's social media accounts; and program instructions to compare each of the users identified interactions with the second user against the predetermined threshold for interactions. the set of possible locations for the second electronic device.

14. The computer system of claim 13, wherein the program instructions stored on the one or more computer readable storage media further comprise:

program instructions to generate a notification for the set of potential responders that comprises, a date of the communication, a time that the communication was sent, identification credentials for the second user, and a custom message that the first user includes for a potential responder of the set of potential responders to deliver to the second user and additional identification information regarding the second user.

15. The computer system product of claim 14, wherein the program instructions stored on the one or more computer readable storage media further comprise:

program instructions to send the notification to the set of potential responders; and program instructions to determine that the custom message was received by the second user.

16. The computer system product of claim 14, wherein the program instructions stored on the one or more computer readable storage media further comprise:

program instructions to, responsive to determining that the custom message was not received by the second user, increase a range in proximity to the second electronic device that is used to determine a new set of potential responders;

program instructions to determine the new set of potential responders based on the increased range in proximity to the second electronic device; and program instructions to send the notification to the new set of potential responders.

17. The computer system of claim 13, wherein the program instructions to determine the communication between the first electronic device and the second electronic device is abnormal comprise:

program instructions to access communication logs between the first user and the second user;

program instructions to determine a communication pattern between the first user and the second user using the accessed communication logs, wherein the communication pattern is determined using a k-nearest neighbor calculation; and program instructions to identify the communication as an abnormal communication based upon the determined communication pattern.

18. The computer system of claim 13, wherein the program instructions to determine the set of potential responders to alert the second user is further based, at least in part, on:

program instructions to retrieve a range within a proximity of the second electronic device; and program instructions to select users within the range as the set of potential responders to alert the second user.

* * * * *